UNITED STATES PATENT OFFICE.

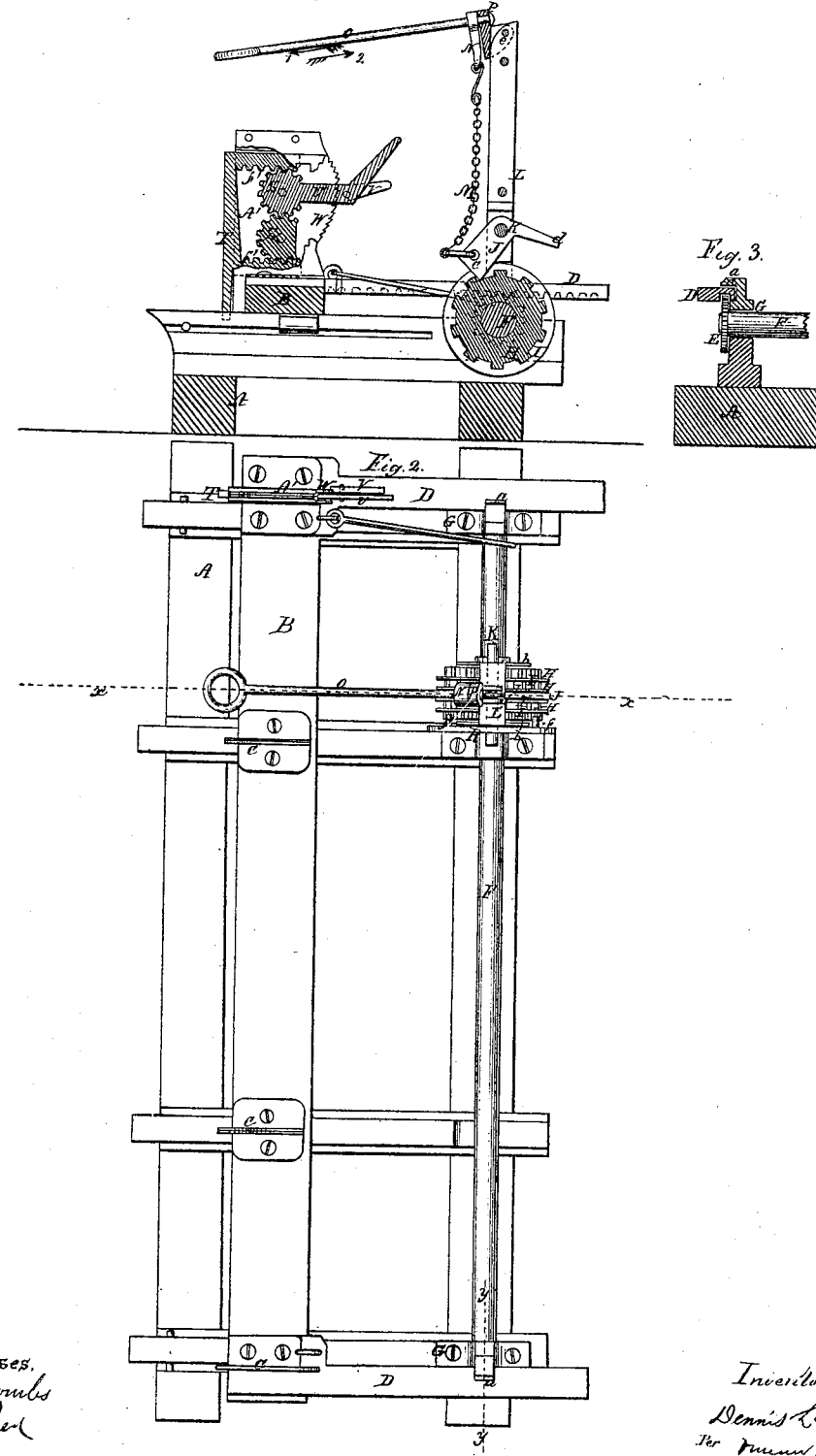
D. Lane,
Saw Mill Carriage,
No. 41,224, Patented Jan. 12, 1864.

DENNIS LANE, OF PLAINFIELD, VERMONT.

IMPROVEMENT IN SAW-MILL CARRIAGES.

Specification forming part of Letters Patent No. 41,224, dated January 12, 1864.

*To all whom it may concern:*

Be it known that I, DENNIS LANE, of Plainfield, in the county of Washington and State of Vermont, have invented a new and useful Improvement in Saw-Mill Carriages; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same; Fig. 3, a section of a portion of the same, taken in the line $y\ y$, Fig. 2.

Similar letters of reference indicate corresponding parts in the several figures.

This invention relates, first, to the employment or use of a dog constructed in a novel way and connected with a lever or handle in such a manner that by a very simple adjustment or manipulation of said lever or handle the log may be set to the saw and the log-supports also gigged back, when necessary, to receive a fresh or new log to be sawed.

The invention relates, second, to a simple and novel means for adjusting the log, so that the same may be sawed in taper form when required, and also to an improved means for holding the racks of a sliding bar, to which the log-supports are attached, in proper position and in gear with the pinions which operate them.

To enable those skilled in the art to fully understand and construct my invention, I will proceed to describe it.

A represents a saw-mill carriage, which may be of any suitable dimensions; and B is a slide-bar, which is placed longitudinally on said carriage and extends its whole length. This slide-bar has uprights C attached to it at suitable distances apart, and to each end of the slide-bar there is attached at right angles a rack, D, and these racks gear into pinions E E at the ends of a shaft, F, which is fitted longitudinally in the carriage A and parallel with the slide-bar B.

The bearings G G of the shaft E are each provided with a lip, $a$, and these lips project over the upper surfaces of the racks D D and hold the same in gear with the pinions E, as shown clearly in Fig. 3.

On the shaft F there are placed side by side a series of ratchets, H, the teeth of which vary in width and number, the teeth of not any two of them being alike. The ratchets, however, are all equal in diameter, and they are divided by circular plates I, which are a trifle larger in diameter than the ratchets, so that a dog, J, may be kept engaged with any one of them, the plates I serving as guides for that purpose. The dog J is of bent form, as shown clearly in Fig. 1, and it is attached to a shaft, K, which is fitted loosely in the forked end of a lever, L, the ends of the prongs $b$ of said fork being fitted loosely on the shaft F, so that they may turn freely thereon. The shaft K, in consequence of being fitted loosely in the prongs $b$ of the lever L, admits of the dog J being adjusted in contact with any one of the ratchets H. The dog J is heavier at one end, $c$, than at the other end, $d$; and the end $c$, in consequence of its superior gravity, has a tendency to engage with the ratchet H, over which it is adjusted. The end $c$ of the dog J is connected by a chain, M, with an arm, N, which is fitted at right angles on a lever or handle, O, said lever or handle being fitted at one end in a link, P, in such a manner that it may turn freely therein. The link P is attached to the upper end of the lever L by a pivot, $e$.

The operation of this portion of the invention is as follows: The log to be sawed rests upon the carriage A and abuts against the uprights C of the slide-bar B, and is retained against them by hooks or dogs Q, any proper number of them being used and attached to the slide-bar. The log is fed to the saw after each cut by moving the handle or lever O in the direction indicated by arrow 1, the heavy end $c$ of the dog J being in contact with a ratchet, H. The dog J thus turns the shaft F, and the pinions E and racks D move the slide-bar B, and consequently the log, to the saw. The distance of the movement of the lever L is governed by two pins, $f\ f$, on a semicircular plate, R, attached to the carriage A, and the distance of the movement of said lever is always the same; but the movement of the slide-bar B varies according to which ratchet H the dog J is engaged with. The setting movement, therefore, of the log may be varied, as desired, according to the required thickness of the stuff to be sawed from the log.

In order to gig back the slide-bar B to receive a new log, the operator simply throws upward or turns the lever or handle O and thereby raises the heavy end $c$ of the dog J from the ratchet and causes the end $d$ to engage therewith, and the slide-bar B will be moved or gigged back as the handle or lever O is shoved in the direction indicated by the arrow 2.

Thus by this simple manipulation of the handle or lever O the slide-bar B may be moved in the two directions specified.

To one end of the slide-bar B there is attached an upright flat box or case, A', in which two segments, S S, are placed, one directly over the other, as shown in Fig. 1. These segments S S also gear into racks $f'$ $f'$, one into each, saw-racks projecting horizontally from the ends of an upright plate or bar, T, which is fitted in the box or case A'. The upper segment, S, has an arm, U, projecting from it, and this arm has a pawl, V, attached, which engages with a ratchet or rack, W, at the back edge of the box or case A'. By moving this arm U it will be seen that the plate or bar T may be adjusted farther in or out and the log set so as to be sawed more or less tapering where required. The plate or bar T bears against the small end of the log, and said plate is retained at the desired point by means of the pawl V and rack W.

I do not claim the ratchets H, for they have been previously used and may be seen in a saw-mill carriage formerly patented by me; but,

Having thus described my invention, what I do claim as new, and desire to secure by Letters Patent, is—

1. The dog J, fitted in the lever L and connected with the lever or handle O, substantially as shown, so that by turning said handle or throwing the same upward one end of the dog may be disengaged from its ratchet and the opposite end engaged with it, for the purpose herein set forth.

2. Adjusting the log so that the same may be sawed more or less tapering by means of the upright plate or bar T, racks $f$, and segments S S, arranged with the arm U, pawl V, and rack W, substantially as described.

3. Providing the bearings of the shaft F with lips $a$, arranged so as to project over the racks D D, substantially as and for the purpose specified.

DENNIS LANE.

Witnesses:
 HIRAM POTTER,
 M. C. HOOKER.